(12) United States Patent
Lettkeman et al.

(10) Patent No.: US 7,504,165 B2
(45) Date of Patent: *Mar. 17, 2009

(54) HIGH STRENGTH FLOORING COMPOSITIONS

(75) Inventors: Dennis M. Lettkeman, Watonga, OK (US); John W. Wilson, Fairview, OK (US); William K. Bedwell, Okeene, OK (US)

(73) Assignee: United States Gypsum Company, Chicago, IL (US)

( * ) Notice: Subject to any disclaimer, the term of this patent is extended or adjusted under 35 U.S.C. 154(b) by 616 days.

This patent is subject to a terminal disclaimer.

(21) Appl. No.: 11/152,324

(22) Filed: Jun. 14, 2005

(65) Prior Publication Data

US 2006/0280970 A1    Dec. 14, 2006

(51) Int. Cl.
| | |
|---|---|
| *B32B 13/00* | (2006.01) |
| *C04B 7/00* | (2006.01) |
| *C04B 9/04* | (2006.01) |
| *C04B 11/00* | (2006.01) |
| *C04B 28/14* | (2006.01) |

(52) U.S. Cl. .................. 428/703; 106/778; 106/779; 106/772; 106/781; 106/783; 106/785; 106/788

(58) Field of Classification Search ................. 428/703; 106/778, 779, 772, 781, 783, 785, 788
See application file for complete search history.

(56) References Cited

U.S. PATENT DOCUMENTS

| | | | |
|---|---|---|---|
| 3,445,323 A * | 5/1969 | Schnabel | ............ 428/330 |
| 4,028,125 A | 6/1977 | Martin | |
| 4,202,857 A | 5/1980 | Lowe | |
| 4,238,239 A | 12/1980 | Brown | |
| 4,341,560 A | 7/1982 | Saito et al. | |
| 4,561,986 A | 12/1985 | Villa et al. | |
| 4,666,971 A | 5/1987 | Greenhalgh | |
| 4,814,014 A | 3/1989 | Arfaei | |
| 4,927,463 A | 5/1990 | Kloetzer et al. | |
| 4,960,465 A | 10/1990 | Arfaei | |
| 5,109,030 A | 4/1992 | Chao et al. | |
| 5,118,751 A | 6/1992 | Schulze et al. | |
| 5,223,036 A | 6/1993 | Koyata et al. | |
| 5,362,323 A | 11/1994 | Koyata et al. | |
| 5,369,198 A | 11/1994 | Albrecht et al. | |
| 5,387,626 A | 2/1995 | Bohme-Kovac et al. | |
| 5,393,343 A | 2/1995 | Darwin et al. | |
| 5,401,798 A | 3/1995 | Rasp et al. | |
| 5,424,099 A | 6/1995 | Stewart et al. | |
| 5,556,460 A | 9/1996 | Berke et al. | |
| 5,614,017 A | 3/1997 | Shawl | |
| 5,643,978 A | 7/1997 | Darwin et al. | |
| 5,661,206 A | 8/1997 | Tanaka et al. | |
| 5,670,578 A | 9/1997 | Shawl | |
| 5,685,903 A | 11/1997 | Stav et al. | |
| 5,703,174 A | 12/1997 | Arfaei et al. | |
| 5,725,656 A | 3/1998 | Shimanovich et al. | |
| 5,725,657 A | 3/1998 | Darwin et al. | |
| 5,739,212 A | 4/1998 | Wutz et al. | |
| 5,779,786 A | 7/1998 | Patel | |
| 5,798,425 A | 8/1998 | Albrecht et al. | |
| 5,834,576 A | 11/1998 | Nagano et al. | |
| 5,858,083 A | 1/1999 | Stav et al. | |
| 5,888,322 A * | 3/1999 | Holland | ............ 156/39 |
| 5,925,184 A | 7/1999 | Hirata et al. | |
| 5,985,989 A | 11/1999 | Shawl et al. | |
| 6,034,208 A | 3/2000 | McDaniel et al. | |
| 6,043,329 A | 3/2000 | Lepori et al. | |
| 6,150,437 A | 11/2000 | Wutz et al. | |
| 6,166,112 A | 12/2000 | Hirata et al. | |
| 6,187,887 B1 | 2/2001 | Albrecht et al. | |
| 6,211,317 B1 | 4/2001 | Albrecht et al. | |
| 6,264,739 B1 | 7/2001 | Yamoto et al. | |
| 6,281,307 B1 | 8/2001 | Muhlebach et al. | |
| 6,294,015 B1 | 9/2001 | Yamashita et al. | |
| 6,376,581 B1 | 4/2002 | Tanaka et al. | |
| 6,527,850 B2 | 3/2003 | Schwartz et al. | |
| 6,620,879 B1 | 9/2003 | Albrecht et al. | |
| 6,800,129 B2 | 10/2004 | Jardine et al. | |
| 6,852,159 B2 | 2/2005 | Kinoshita et al. | |
| 2003/0019401 A1 | 1/2003 | Schwartz et al. | |
| 2003/0084980 A1 * | 5/2003 | Seufert et al. | ............ 156/39 |
| 2003/0127026 A1 | 7/2003 | Anderson et al. | |

(Continued)

FOREIGN PATENT DOCUMENTS

EP    0644165    3/1995

(Continued)

*Primary Examiner*—Elizabeth D Wood
(74) *Attorney, Agent, or Firm*—Greer, Burns & Crain, Ltd.; David F. Janci, Esq.; Pradip Sahu, Esq.

(57) ABSTRACT

A composition is disclosed for a mixture to be used in conjunction with water for preparing a slurry that hydrates to form a high strength flooring compound. The mixture includes from about 50% to about 98% by weight calcium sulfate hemihydrate. A three repeating unit polycarboxylate dispersant is included in the mixture in amounts from about 0.2% to about 10% by weight. The repeating units include a polyether repeating unit, an acrylic acid-type repeating unit and a maleic acid-type repeating unit. A modifier that enhances the efficacy of the dispersant is also a component of the mixture. When combined with recommended amounts of water, a slurry is formed that is useful as a flooring composition.

18 Claims, No Drawings

U.S. PATENT DOCUMENTS

| | | |
|---|---|---|
| 2003/0167973 A1 | 9/2003 | Peev et al. |
| 2004/0045481 A1 | 3/2004 | Sethuraman et al. |
| 2004/0072939 A1 | 4/2004 | Cornman et al. |
| 2004/0149172 A1 | 8/2004 | Jardine et al. |
| 2004/0149174 A1 | 8/2004 | Farrington et al. |
| 2004/0170873 A1 | 9/2004 | Smith |
| 2004/0187741 A1* | 9/2004 | Liu et al. .................... 106/785 |
| 2004/0198873 A1 | 10/2004 | Bury et al. |
| 2004/0211342 A1 | 10/2004 | Sprouts et al. |

FOREIGN PATENT DOCUMENTS

| | | |
|---|---|---|
| EP | 0725044 | 8/1996 |
| JP | 56045857 | 4/1981 |
| JP | 59025876 | 2/1984 |
| JP | 61040861 | 2/1986 |
| WO | WO 9533698 | 12/1995 |
| WO | WO 0181263 | 11/2001 |
| WO | WO 03/082765 | 10/2003 |
| WO | WO 03/082766 | 10/2003 |

* cited by examiner

HIGH STRENGTH FLOORING COMPOSITIONS

CROSS REFERENCE TO RELATED APPLICATIONS

This application is related to co-pending U.S. Ser. No. 11/152,661 entitled "Fast Drying Wallbroad" and U.S. Ser. No. 11/152,317, entitled "Modifiers for Gypsum Products and Methods of Using Them" and U.S. Ser. No. 11/ 152,323, entitled "Method of Making a Gypsum Slurry with Modifiers and Dispersants", all filed concurrently herewith and each herein incorporated by reference.

BACKGROUND

This invention relates to a high strength flooring composition. More specifically, it relates to a flooring composition made using beta-calcined calcium sulfate hemihydrate, a dispersant and a modifier.

Both gypsum and cement are well known as construction materials. Gypsum is the principal component of wallboard, where is it faced with paper to provide strength and a smooth surface. Cement is used in various applications where its water resistance and hardness are important, such as in concrete structures. Cement is also used in building applications where its hardness and water resistance are important.

Gypsum is also known as calcium sulfate dihydrate, terra alba or landplaster. Plaster of Paris is also known as calcined gypsum, stucco, calcium sulfate semihydrate, calcium sulfate half-hydrate or calcium sulfate hemihydrate. Synthetic gypsum, which is a byproduct of flue gas desulfurization processes from power plants, may also be used. When it is mined, raw gypsum is generally found in the dihydrate form. In this form, there are approximately two water molecules of water associated with each molecule of calcium sulfate. In order to produce the hemihydrate form, the gypsum is calcined to drive off some of the water of hydration by the following equation:

$$CaSO_4 \cdot 2H_2O \rightarrow CaSO_4 \cdot 1/2H_2O + 3/2H_2O$$

When mixed with water, the hemihydrate rehydrates to form an interlocking matrix of interlocking dihydrate crystals. Gypsum hydration occurs in a matter of minutes or hours compared to several days for cement. This makes gypsum an attractive alternative for many applications if sufficient hardness and strength can be achieved in the gypsum.

Calcium sulfate hemihydrate can produce at least two crystal forms during calcination. Alpha-calcined gypsum is made by a continuous process or lump rock process whereby the calcium sulfate dihydrate is calcined under pressure. The alpha-calcined gypsum forms less acicular crystals than beta-calcined gypsum, allowing the crystals to pack tightly together, making a denser and stronger plaster. The crystal morphology allows water to flow easily between the crystals, requiring less water to form a flowable slurry. More elongated crystals are characteristic of the beta-calcined gypsum. This crystal structure results in a less dense product because the crystals are more loosely packed. The beta form also requires more water to fluidize the calcined gypsum. In applications where hardness is important, alpha-calcined gypsum is usually preferred, despite higher cost and limited availability.

When choosing a calcined gypsum for an application, beta-calcined gypsum is often selected due to its ready availability and its reduced cost. Because beta-calcined gypsum is also more common, it can incur reduced shipping and storage costs than the alpha form. However, the crystal structure makes it difficult to make a strong, dense gypsum because more water is needed to produce a sluny of a given fluidity. When the gypsum is dry, voids once occupied by water remain in the crystal matrix, weakening it and producing a product having less strength than gypsum made with smaller amounts of water. A low-water gypsum slurry is particularly useful in an application such as a poured floor, where strength is important. Gypsum-based flooring is advantageously used where rapid set of the floor is required.

Dispersants are known for use with gypsum that help fluidize the mixture of water and calcium sulfate hemihydrate so that less water is needed to make a flowable slurry. However, these dispersants have several disadvantages. Polycarboxylate dispersants can be severely retardive, significantly reducing the rate of the setting reaction. Increases in the setting time can disrupt the manufacturing process of the floor. Lengthened set times result in delays in finishing and using the floor. Accelerators that may be added to overcome the retarding effect of the dispersant may be rendered less effective than in compositions where no dispersant is used.

Despite the large amount of prior art to polycarboxytate dispersants, it is difficult to predict the effect of any particular compound on the products produced with it. Polycarboxylates are generally known to improve fluidity in cement. This does not necessarily mean that the polycarboxylate will produce the same result in gypsum products. Gypsum and cement form different crystal patterns that may disperse differently in a polycarboxylate solution. The set times of these hydraulic materials are very different, making the retardive effects of some polycarboxylates that are negligible in cement critical to the set of a gypsum wallboard. There are even variations within the realm of gypsum products, with some polycarboxylates being effective for certain gypsum sources and not others. The complete lack of predictability of polycarboxylate efficacy in gypsum or cement makes it difficult to make a low-water product.

Further, retardation of the set times by the use of large amounts of polycarboxylate dispersants cannot always be overcome by the addition of set accelerators. When high dosages of polycarboxylates are used to make a flowable slurry at low water to stucco ratios, the set time can be delayed enough to require changes in how the product is handled, often resulting in inefficiencies in the manufacturing process.

Surface water balance can be difficult to achieve in hydraulic products. Sand or other aggregates in the sluny can fall out of the suspension and sink to the bottom of the mixture. Water can also come out of the suspension, rising to the top of the slurry. If too much water bleeds from the slurry, the surface is weakened because of voids left from drying. However, if the surface is too dry, there is insufficient water to hydrate the calcined gypsum. This leaves a powder on the surface of the flooring that makes it more difficult to adhere finished floor goods such as vinyl or ceramic tile, without additional preparation. Wear resistance of the floor is also reduced. When used in a poured floor, for example, it is advantageous to have a thin film of water on the surface of the slurry. This water makes sure the surface is hydrated and also aids in finishing the surface. Some dispersants rise to the top of the slurry with the water, leaving the dispersant unevenly distributed in the bottom of the fluid. If the dispersant rises into the water film on top of the slurry, the surface water can become sticky, leaving a poor surface that is difficult to finish.

BRIEF DESCRIPTION OF THE INVENTION

These and other problems associated with gypsum-based flooring products are improved by the composition of the present invention which includes a slurry, an aggregate More specifically, one embodiment of this invention is a mixture to be used in conjunction with water for preparing a slurry including from about 50% to about 98% by weight calcium sulfate hemihydrate, having at least 25% of the calcium sulfate hemihydrate in the beta-calcined form. A specific polycarboxylate dispersant used in the mixture includes at least three repeating units. A first repeating unit includes poly oxyalkylether. A second repeating unit includes a maleic acid-type repeating unit. A third repeating unit includes an acrylic acid-type repeating unit. The dispersant is included in the mixture in amounts from about 0.02% to about 10% by weight. When combined with recommended amounts of water, a slurry is formed that is useful as a flooring composition.

In another embodiment of this invention, the mixture can be used to make a fast drying flooring composition that cures in days rather than weeks. The fastest drying products are obtained by reducing the water to less than 25% of the weight of the dry ingredients. Use of alpha-hemihydrate for up to 100% the total hemihydrate is preferred in the no-dry or low-dry product.

The present composition results in formation of a high-strength flooring even when 100% of the hemihydrate in the beta form is used. In the presence of a modifier, such as cement or lime, the polycarboxylate dispersant is more effective than other superplasticizers, making the slurry more fluid and flowable. Fluidity of the mixture is so good that beta-calcined gypsum or mixtures of alpha and beta-calcined gypsum are fluidized in the slurry at low water usage to make a denser, stronger flooring product than is known in the art.

Use of the mixture of this invention, or a slurry made with it, results in a surface having reduced stickiness and is easier to finish. The surface is smoother compared to floors finished with other dispersants. Finishers using the slurry of this invention are able to complete a job with less fatigue and in less time. Bleed water from the slurry is also reduced, and sand suspension is improved, resulting in a better quality finish.

DETAILED DESCRIPTION OF THE INVENTION

A mixture, which when combined with water makes a slurry suitable for use in flooring applications, is made from calcium sulfate hemihydrate, a modifier and a polycarboxylate dispersant. High strength floors and subfloors are made with this composition having compressive strength in excess of 2500 pounds per square inch (175 Kg/cm$^2$). In a preferred embodiment described in detail below, all components of the composition are described in terms of dry ingredients in a dry mixture. It is contemplated that this is only one possible embodiment, and that liquid ingredients, when measured on a dry solids basis, are equivalent to the dry components. Unless otherwise stated, all components are measured in terms of weight on a dry solids basis, excluding any aggregate or fillers that may be present.

The primary component of the dry mixture is calcium sulfate hemihydrate or stucco. The dry mixture composition preferably includes from about 50% to about 98% hemihydrate by weight. More preferably, from about 80% to about 98%, from about 80% to about 95% or from about 88% to about 95% of the dry mixture is calcium sulfate hemihydrate.

Any type of hemihydrate is useful in this mixture. It can be prepared by any known process, such as slurry processes, lump rock processes or atmospheric calcination methods. Either alpha calcined calcium sulfate hemihydrate or beta calcium sulfate hemihydrate are useful in the mixture. The alpha form of calcium sulfate hemihydrate crystals is less acicular in shape than the beta version. The less acicular shape allows the crystals to wet out and flow much better when mixed with water. The lower water demand of the alpha form results in a more closely packed, and higher density composite in comparison to the resultant interlocking matrix of calcium sulfate hemihydrate crystals utilizing the beta form of calcium sulfate hemihydrate. As is known in the art, the combination of alpha and/or beta calcium sulfate hemihydrate controls the amount of water needed to form a workable slurry, which controls the density of the final cast model.

Any alpha or beta-calcined hemihydrate is suitable for use in the present composition. Preferred alpha-hemihydrates include those made from a slurry process, such as HYDROCAL C-Base, J-Base or E-Base from United States Gypsum Company (Chicago, Ill.), by lump rock processes, such as HYDROCAL A-Base or B-Base, or any other method of making alpha-calcined hemihydrate. No. 1 Moulding plaster is a preferred beta-hemihydrate from United States Gypsum Co. (Chicago, Ill.). Continuously calcined synthetic gypsum is equivalent to beta-calcined hemihydrate. Beta-hemihydrate made from other methods is also useful. The addition of soluble calcium sulfate anhydrite is a suitable substitute for up to 50% of the hemihydrate, and will serve to provide strength to the matrix. Calcium sulfate dihydrate serves as a filler and should be used only in minor amounts, less than 25% by weight of the hemihydrate.

Whether beta-calcined gypsum, alpha-calcined gypsum or a combination of alpha and beta is selected for a particular application depends on a number of factors. Preferably, beta-calcined gypsum is used to a large extent where cost is a primary concern or availability of alpha-calcined gypsum is limited. Beta-calcined gypsum also has higher workability and bleeds less than the alpha form. However, in some embodiments, where even higher strength is desirable, the alpha-hemihydrate or mixtures of the alpha and beta forms are preferred. Where mixtures of alpha and beta-calcined hemihydrate are used, the mixture should include at least 25% beta-hemihydrate. Preferably, the amount of the beta-calcined form is greater than 50% or greater than 90% of the total hemihydrate.

The modifier is a non-dispersant additive that improves the efficacy of the dispersant. Preferably, the modifier is at least one of cement and lime, phosphonates, phosphates, carbonates, silicates and hydroxides. Preferred modifiers include lime, soda ash or sodium carbonate and potassium carbonate. When tested with gypsum in the absence of cement or lime, polycarboxylates had dispersing properties comparable to those of other well-known dispersants. However, when combined with a modifier, the polycarboxylate surprisingly displays even greater dispersion properties. Use of modifiers with gypsum is further described in U.S. Ser. No. 11/152,317 entitled "Modifiers for Gypsum Products and Methods of Using Them", previously incorporated by reference.

At least one modifier is present to obtain the extraordinary performance from the polycarboxylate. Preferred modifiers include lime and hydraulic cement. Preferably, the concentration of lime is less than 2.5% or less than 1% by weight of the dry ingredients. Generally, the modifier is present in amounts of from about 0.05% to about 10% if it is not a hydraulic material. Another preferred modifier is soda ash or sodium carbonate. Soda ash boosts the performance of the polycarboxylate without forming a slurry of high pH. Where high pH is acceptable, hydroxides particularly sodium hydroxide, potassium hydroxide or calcium hydroxide is useful. Other carbonates, silicates, phosphonates and phosphates are also useful as modifiers. The use of two or more modifiers is also contemplated. In a dry powder form, lime is convenient for the addition to the preferred dry mixture, however, it is also contemplated that liquid forms are also useful, and could be added to the water prior to addition of the dry mixture. If a liquid is used, the amount of the modifier should be measured on a dry solids basis and any water should be considered in the water content of the slurry.

If the modifier is cement or other siliceous hydraulic material, amounts up to 50% of the dry mixture can be used. Like gypsum, hydraulic cement hardens by a chemical interaction with water. Exemplary hydraulic cements are Portland cement, fly ash, blast furnace slag, and silica fume. The most widely used cement is Portland cement (Aalsborg Cement, Denmark), which is particularly preferred for use in this invention. More preferred cements are Type 1, Type 3 and Type 5 cements. Either gray or white cement can be used. Class C cement, slag cement and #1 Impmill cement are also contemplated for use in this composition. Other hydraulic silicates are also considered to be useful as the modifier. If no other modifiers are present, the mixture includes at least 0.5% cement. Preferably the concentration of cement is from about 1.7% to about 50% by weight of the dry ingredient weight.

When modifiers are used with polycarboxylate dispersants, it has been found that the order of adding the components to the slurry affects the efficacy of the modifier. Modifiers are less effective when added to the slurry after the dispersant contacts the calcined gypsum. Preferably the modifiers and the dispersant are added to the mixer water prior to the addition of the hemihydrate. If both the modifier and the dispersant are in dry form, they can be preblended with each other and added with the stucco. This method is further described in U.S. Ser. No. 11/152,323 entitled "Method of Making a Gypsum Slurry with Modifiers and Dispersants", filed concurrently herewith and hererin incorporated by reference.

The polycarboxylate dispersant is required in concentrations of from about 0.2% to about 10% by weight on a dry component basis. More preferably, the dry mixture includes from about 0.2% to about 5% or about 0.2% to about 2.5% of the polycarboxylate.

Another key component of the gypsum slurry or wallboard of this invention is the specific dispersant used. The dispersants of interest are a subclass of the class of compounds further described in U.S. Pat. No. 6,777,517, herein incorporated by reference. They are copolymers containing at least three repeating units and preferably have a molecular weight of from about 20,000 to about 80,000 Daltons. More preferably, the molecular weight of the copolymer is from about 30,000 to about 50,000 Daltons. The repeating units can be present in the copolymer in any order, including random arrangement along the polymer backbone. Use of this dispersant in wallboard applications is further discussed in U.S. Ser. No. 11/152,661 entitled "Fast Drying Wallboard", previously incorporated by reference.

The first repeating unit is an acrylic acid-type repeating unit or its derivative, shown in Formula I. $R^1$ is a hydrogen atom or an aliphatic hydrocarbon radical having from 1 to 20 carbon atoms. X is $-O_aM$, $-O-(C_mH_{2m}O)_n-R^2$, $-NH-(C_mH_{2m}O)_n-R^2$, where M is a hydrogen, a monovalent or divalent metal cation, an ammonium ion or an organic amine radical, a is ½ or 1 depending on whether M is a monovalent or divalent cation, m is 2 to 4, n is 0 to 200 and $R^2$ is a hydrogen atom, an aliphatic hydrocarbon radical having from 1 to 20 carbon atoms, a cycloaliphatic hydrocarbon radical having from 5 to 8 carbon atoms, a substituted or unsubstituted aryl radical having from 6 to 14 carbon atoms. Preferred first repeating units include acrylic acid and methacrylic acid or their monovalent or divalent metal salts. Preferred metals are sodium, potassium, calcium or ammonium.

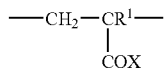

The second repeating unit is a vinyl ether-type repeating unit, shown in Formula II. $R^2$ is as described above. $R^3$ is a hydrogen atom, or an aliphatic hydrocarbon radical having from 1 to 5 carbon atoms. P is from 0 to 3, m is 2 to 4 and n is 0 to 200. Preferably, $R^2$ is a hydrogen atom or an aliphatic hydrocarbon radical having from 1 to 5 carbon atoms and p=0 to 3. The use of polyethylene glycol monovinyl ethers (p=0 and m=2) are particularly advantageous, with n preferably being from 1 to 50.

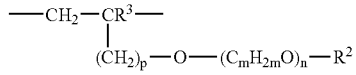

The third repeating unit is a maleic acid-type repeating unit or its ester, as shown in Formula III. In Formula III, $R^4$ is a hydrogen or an aliphatic hydrocarbon radical having from 1 to 5 carbon atoms. S is a hydrogen atom, a carboxylic acid, the acid salt containing a monovalent or divalent metal cation, an ammonium ion or an organic amine radical or the acid ester of an aliphatic hydrocarbon radical having from 3 to 20 carbon atoms, a cycloaliphatic hydrocarbon radical having from 5 to 8 carbon atoms or an aryl radial having from 6 to 14 carbon atoms. T is an acid ester of an aliphatic hydrocarbon radical having from 3 to 20 carbon atoms, a cycloaliphatic hydrocarbon radical having from 5 to 8 carbon atoms or an aryl radial having from 6 to 14 carbon atoms. Examples of preferred ester compounds include di-n-butyl maleate or fumarate or mono-n-butyl maleate or fumarate.

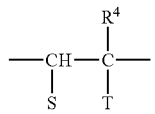

Polymerization of the monomers is carried out by any method known by an artisan. A preferred method of making the polymer is taught in U.S. Pat. No. 6,777,517, previously incorporated by reference. Several commercially available polycarboxylate dispersants are also useful in this invention. MELFLUX 2641F, a product of Degussa Construction Polymers, GmbH (Trostberg Germany) and supplied in the United States by Degussa Corp. (Kennesaw, Ga.) (hereafter "Degussa"), is a particularly preferred polycarboxylate dispersant. (MELFLUX is a registered trademark of Degussa Construction Polymers, GmbH). It is a free flowing powder produced by spray-drying a modified polyether carboxylate. Other preferred polycarboxylate dispersants include MELFLUX 2651F and MELFLUX 2500 L by Degussa, and other polycarboxylate dispersants that are based on oxyalkylene-alkyl ethers, maleic acid and acrylic acid repeating units. MELFLUX 2500 L is a liquid dispersant that contains 43% solids by weight in an aqueous suspension. In measuring the liquid dispersant, only the polymer solids are considered in calculating the dosage of the dispersant, and the water from the dispersant is considered when a water/stucco ratio is calculated.

Many polymers can be made with the same three repeating units using different distributions of them. The ratio of the acid-containing repeating units to the polyether-containing repeating unit is directly related to the charge density. Preferably, the charge density of the co-polymer is in the range of about 300 to about 3000 µequiv. charges/g co-polymer. It has been found that the most effective dispersant tested for water reduction in this class of dispersants, MELFLUX 2651F, has the highest charge density.

However, it has also been discovered that the increase in charge density further results in an increase in the retardive effect of the dispersant. Dispersants with a low charge density, such as MELFLUX 2500 L, retard the set times less than the MELFLUX 2651F dispersant having a high charge density. Since retardation in set times increases with the increase in efficacy obtained with dispersants of high charge density, making a slurry with low water, good flowability and reasonable set times requires keeping of the charge density in a mid-range. More preferably, the charge density of the co-polymer is in the range of about 600 to about 2000 µequiv. charges/g co-polymer.

It is also noted that the polycarboxylate dispersants of the present invention are sufficiently effective that they need not be combined with other dispersants. Preferably, the flooring, and the slurry from which it is made, are free of naphthalene-type dispersants.

The amount of water added to the dry mixture ranges from 10% of the weight of the dry mixture to about 50% by weight. Preferably, the water content ranges from about 20% to about 40%, from about 12% to about 40% and more preferably from about 28% to about 32%. The selection of a suitable amount of water to be added is within the skill of an artisan. Water usage less than that theoretically needed to hydrate the hydraulic components is used in some embodiments of the composition.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

Embodiments to fast drying flooring compositions are also obtainable using up to 100% alpha-hemihydrate. By reducing the water content, there is less water to be removed by drying. The preferable water content ranges from about 15% to about 25%. Improvement in the flowability of the slurry allows formation of a pumpable slurry at lower water levels, even below that theoretically required for complete hydration of the hemihydrate. In any plaster composition, increased water addition decreases the strength of the set plaster.

Many additional ingredients are suitable to optimize the dry mixture. Defoamers are used to reduce air bubbles formed during mixing of the dry mixture with the water. When used, the dry mixture includes up to 0.5% defoamer. FOAMASTER CN (Astro Chemicals, Kankakee, Ill.) and AGITAN P-801, P-800, P-823 (Munzing Chemie, Heilbronn, Germany) are preferred defoamers.

Boric acid is optionally added to the dry mixture to reduce calcination and mold/mildew growth. Preferably, it is added in amounts up to 1.25%. Other preferable ranges of boric acid addition are up to 1% and up to 0.5%.

Retarders are added to increase the working time of the slurry. Target working time is from about 10 minutes to about 2 hours depending on the composition being used, where and how the slurry is being applied. Any retarders known to be useful with calcium sulfate hemihydrate are suitable in amounts to produce working times consistent with the target range. Proteinaceous retarders, such as SUMA, Cream of Tartar (potassium bitartrate), Rochelle salts potassium sodium tartrate, sodium citrate and diethylenetriamine pentaacetic acid are also preferred.

Set accelerators are used to hasten setting of the slurry. Any accelerators known to hasten setting of the hemihydrate may be used, including, but not limited to sulfates, acids and calcium sulfate dihydrate. Useful amounts vary with the efficacy of the accelerator selected, but are generally less than 1% by weight.

Calcium sulfate dihydrate that has been finely ground is a preferred accelerator. When freshly prepared, it has high potency and is suitable for immediate use in the slurry. However, when stored prior to use, it loses its effectiveness. U.S. Pat. No. 2,078,198, herein incorporated by reference, discloses improved accelerators comprising calcium sulfate dihydrate intermixed with a material such as sugar. This mixture renders the calcium sulfate dihydrate less subject to deterioration by aging and is useful in the slurry within several days (weeks). Heating the co-ground sugar and calcium sulfate dihydrate mixture so that caramelized sugar forms a coating on the calcium sulfate dihydrate is disclosed in U.S. Pat. No. 3,573,947, herein incorporated by reference. The melted sugar coating further stabilizes the calcium sulfate dihydrate, reducing the effects of aging to a greater degree than the unheated sugar/dihydrate mixture. Ground calcium sulfate dihydrate prepared in this manner is referenced in the examples as "CSA" (United States Gypsum Co., Chicago, Ill.). In any form, the ground dehydrate is preferably used in concentrations less than 0.5% by weight.

The addition of 0.0006% to about 0.5% polysaccharide improves the sand loading, reduces bleed and settling, and improves pumpability of the composition of this embodiment. The use of polycarboylate and polysaccharides together results in a product that is easy to handle, is uniform and has high strength, a combination of properties that cannot be achieved by the use of either polymer alone. Polysaccharides also act with the polycarboxylate dispersants to keep the components of the slurry in suspension until the crystal matrix forms sufficiently to assure uniform distribution. Sand or other aggregates are prevented from settling. The slurry is less viscous and easier to pump, thereby reducing energy costs. Workability of the composition and surface lubricity are also increased.

The polysaccharides that are particularly preferred for use with this invention are varied. Biopolymeric gums are most preferred. Glucan products, such as scleroglucan, schizophyllan and the like are especially preferred. Scleroglucan is produced by filamentous fungi of the genera Sclerotium. Schizophyllan is an extracellular polysaccharide produced by fungi of the genera Schnizophyllum. Scleroglucan and schizophyllan are polysaccharides whose linear chain of 1-3 linked D-glycosyl units with about 30 to about 35 percent of the linear chain containing single D-glycosyl units that are attached by 1-6 linkages. The average molecular weight is greater than or equal to $5 \times 10^6$. They are nonionic homopolysacchrides. The chains are self-associated in a triple helix arrangement. They dissolve in water to form pseudo plastic solutions. Additional characterization of these compounds and a method for making them are taught in U.S. Pat. No. 4,954,440, herein incorporated by reference. A preferred scleroglucan is marketed by Degussa Corporation (Kennesaw, Ga.) under the trade name BIOVIS. Other polysaccharide gums, such as xanthan gums, welan gums and other gums are can also be used with this invention.

Heteropolysaccharides are high molecular weight, generally linear carbohydrate polymers containing two or more different kinds of monosaccharides. The two or more kinds of monosaccharides that form a repeating unit that is polymerized, such as S-657, are discussed in U.S. Pat. Nos. 5,175,278 and 6,110,271 herein incorporated by reference. This polysaccharide is an example of a xanthan gum that is particularly useful in this invention. S-657 forms an extended intertwined 3-fold left-handed double helix with a molecular weight estimated in excess of two million Daltons and is marketed under the trade name Diutan by Kelco Biopolymers (San Diego, Calif.).

When aggregates are added to the composition, any aggregate known to those skilled in the art may be used. Silica sand and other silicates are the most common aggregates used due to their low cost and ready availability. The aggregate can be selected to modify the density of the finished product. A wide range of sands are applicable with this invention, including river sand, Mohawk Medium sand, Rich Mix Fine sand, Atlanta sand, Dothan Sand, Florida sand and the like. Sands of various types can be combined to obtain specific particle size distribution or other properties. Heavier aggregates, such as, but not limited to, rock, gravel, pea gravel and silica fume increase the density of the product, while the addition of hadite, clay, pumice, foam, vermiculite or hollow microspheres decrease the density. Any type of filler, such as perlite, flyash or slag, can also be used. The aggregate is added to the composition in amounts up to 300 wt % of the aggregate-free components on a dry basis.

The compositions of this invention optionally have a number of further additives depending on the specific application. These additives can include thickeners, coloring agents, preservatives and other additives in amounts known in the art. Additives for a particular purpose, as well as the appropriate concentrations, are known to those skilled in the art. Coloring agents, such as pigments, dyes or stains are also useful as additives, particularly in flooring applications. Any known coloring agents can be used with this invention. Titanium dioxide is particularly useful to whiten the composition. The coloring agents are used in amounts and added by methods conventionally used for compositions of this type.

In another embodiment of this invention, the mixture is adjusted to make a self-leveling flooring that requires little or no finishing to produce a high quality, level surface. Slurries for use in this application are more free-flowing. Although the viscosity of the slurry can be reduced merely by adding water, strength of the finished product is reduced and separation of the water, known as bleeding, is increased. Leveling compositions generally incorporate a polymeric resin into the slurry and may require modification of the composition.

Leveling compositions also utilize a polymeric resin to modify the surface properties of the finished floor. Surface brittleness is reduced when polymers are used in concentrations of up to 5%, or preferably from about 0.05% to about 1%. Exemplary resins include 10184 and 50E 200 from Elotex AG (Sempach, Switzerland) and VINNAPAS RP-226 (Wacker Polymer Systems, LP, Adrian, Mich.).

It is often advantageous to vary the composition within the scope of this invention depending upon the mixing or pumping equipment that is used. Different brands of pumping equipment produce shear forces that require certain properties of the slurry to flow properly. Some machines utilize aggregate of a specific particle size distribution. Other machine manufacturers recommend slight changes to the composition. Modifications of the composition to accommodate the equipment available are considered to be within the skill of one who normally prepares slurries for such equipment.

When used as a topical underlayment, the composition is modified to be free-flowing and easily pumped through a hose. Higher fluidity is desired without separation of the aggregate. In this application, water and the polymeric resin are used at the high end of their concentration ranges. The aggregate should be selected to reduce separation of settling of the solids in the hose.

Use of these compositions requires no special mixing steps or process conditions to make a high quality product. Ingredients to make the dry mixture or the slurry are obtained. Depending on the exact additive selected, it can be available in either liquid form, dry form or both. If used in liquid form, the additive concentration is determined on a dry basis. The present mixture is made by obtaining ingredients comprising from about 50% to about 98% calcium sulfate hemihydrate comprising at least 25% of the beta-calcined form, from about 0.2% to about 10% polycarboxylate dispersant and from about 0.05% to about 50% of a modifier, all on a dry solids basis. Optional additives such as set accelerators, retarders, polymeric resins, defoamers, and the like, are also assembled. The ingredients are preferably separated into wet ingredients and dry ingredients for ease of mixing. The dry ingredients are optionally blended in a mixer, such as a Marion mixer, until a homogeneous mixture is attained. The dry mixture is optionally packaged for later sale or distribution.

At the site where the floor or subfloor is to be laid, about 12 cc to about 40 cc of water is measured per 100 grams of the ingredients on a dry solids basis, and placed into a mixing vessel. If any wet or liquid ingredients are used, they are mixed into the water. The dry ingredients are then mixed into the water, forming a homogeneous slurry. The slurry is then applied, pumped, dumped or poured onto a substrate and allowed to set, forming a floor or subfloor.

Although this floor product does not require finishing, finishing the surface is desirable under circumstances as will be known to those skilled in the art. Choice of a finishing technique allows the finisher to control the surface properties to some degree, including the surface wear. The floor is optionally finished by any technique known to cement finishers, including but not limited to floating, pinrolling or screeding.

These and other embodiments are demonstrated in the following Examples. In the examples, unless otherwise noted, all amounts listed are in pounds. Concentrations or percentages are calculated on a dry, aggregate-free weight basis.

Several of the examples use a slump test to study how well an aggregate such as sand is suspended in the slurry. The test is intended to simulate conditions where a floor is being poured and the slurry is pumped through hoses. Occasionally the pump has to be stopped to switch to a different batch or to move the hose to a different section of the floor. During these times the slurry sits undisturbed in the hose for several minutes before pumping is resumed. The slump test is intended to simulate these conditions.

Unless otherwise noted, a 4000 gram sample was prepared based on the dry components. All dry components, including aggregate, were weighed and dry blended together. The predetermined amount of deionized water was measured and poured into a mixing bowl. The dry blended material was added to the water and the time noted as the starting point to determine the set time. The mixing bowl was placed onto a HOBART mixer and mixed for approximately five seconds. After one minute of soaking, the material was mixed at low speed for two minutes. The bowl was removed from the mixer and the contents stirred for about 15 seconds with a wisk to assure that all material was evenly mixed.

The initial slump sample was poured into a damp 2"×4" (5 cm×10 cm) cylinder placed on a plastic sheet, slightly overfilling the cylinder. Excess material was screeded from the top, then the cylinder was lifted up smoothly, allowing the slurry to flow out the bottom, making the patty. The patty was measured (±⅛") in two directions 90° apart, and the average reported as the patty diameter. The remaining sample material was permitted to set undisturbed in the pitcher for 5 minutes. Without stirring, additional slump samples were poured at five minute intervals until all the material was gone or until the material set and could not be poured. The mix was not stirred between slump samples.

Bleed water was determined as the excess amount of water on the surface of the samples after the material had set. A 130 mL sample was poured into a 240 mL set cup and allowed to set until Vicat set was achieved. The cup containing the sample and the bleed water was weighed (±0.10 g.). Next, the bleed water was poured off and the cup shaken to remove all excess water. The cup and sample were re-weighed. The bleed water was calculated as follows:

(Initial Weight−Final Weight)÷Initial Weight*100=% Bleed Water

Aggregated two-inch cubes were used to test density and compressive strength. Cube molds were prepared by sealing the bottom of the mold with petroleum jelly to prevent leaking and lubricating the molds with an approved release agent, such as WD-40. Sample material was poured into the corner of the cubes until they were approximately ¾ full, stirring to keep the sand suspended if needed. Using a small spatula, the sample material was vigorously agitated from corner to corner for 3-5 seconds, eliminating all bubbles in the cube. The cubes were then filled to slightly overfull, and the remaining sample material poured into the set cup for additional testing. Excess sample was screeded from the cube molds ten minutes after Vicat set and the cubes were carefully removed from the molds approximately 50 minutes later. About 24 hours after the cubes were made, they were placed in a 110° F. (43° C.) forced air oven for eight days until constant weight was achieved.

Density of the samples was determined by weighing a number of dried cubes and applying the following formula:

Density (lb/ft$^3$)=(Weight of cubes*0.47598)÷number of cubes

Aggregated cubes were used to test for compressive strength using a compressive strength testing machine. Cubes were placed between two platens. Force was applied to the cube as the platens were pushed together. The machine recorded the pounds of force that were required to crush the cube. Total force in pounds was converted to pounds per square inch (psi) by dividing by the surface area of the sample, in this case 4 in$^2$ (25 cm$^2$).

References to set time refer to Vicat set time per ASTM C-472, herein incorporated by reference. The Vicat set time started from the time the plaster was added to the water for hand mixes and from the time the slurry came off the mixer for machine mixes. A sample was made up of 50 grams of dry, aggregate-free material and sufficient water to make a normal consistency for the desired application. The sample was poured onto an acrylic sheet to form a patty. A 300 gram Vicat needle was held half way between the center and the outer edge of the patty, perpendicular to the patty surface. The needle was held to the patty surface and released to fall freely of it's own weight. Set time was determined when the needle failed to penetrate to the bottom of the patty. If the degree of penetration was unclear, the needle was given a little push to determine if it had touched the underlying surface.

EXAMPLE 1

A gypsum cement formulation suitable for use in a floor underlayment product was made according to the present invention. Beta-Calcined gypsum was substituted for a substantial amount of the alpha-calcined gypsum, and a high quality product was made with the addition of from about 0.025% to about 10% polycarboxylates.

TABLE I

Floor Underlayment Composition

| Component | 7-133 | 12-95 | 3-116 |
|---|---|---|---|
| beta-Calcined Gypsum | 3775 | 2710 | 3775 |
| alpha-Calcined Gypsum | 0 | 930 | 0 |
| Class C Cement | 200 | 200 | 200 |
| Defoamer | 2 | 7 | 7 |
| Boric Acid | 0 | 5 | 5 |
| CSA | 0.25 | 0.25 | 0.25 |
| Proteinacous Retarder | 3.25 | 0.25 | 0.5 |
| MELFLUX Plasticizer | 2641 F | 1641 F | 1641 F |
| Plasticizer Amount | 15 | 17 | 25 |
| Water, cc/1000 g dry aggregate | 185 | 190 | 185 |
| Stabilizer Premix | 0 | 0 | 2 |

The dry components were dry blended and 1185 gram samples were measured. Each sample was mixed with 2815 grams of sand, then all components were added to the water and blended. Results for slump tests, density and strength are shown in Table II.

TABLE II

Physical Properties of Floor Underlayments

|  | 7-133 | 12-95 | 3-116 |
|---|---|---|---|
| Slump, Inches (cm) | 8¹⁵⁄₁₆ | 9¾ | 8⅞ |
| Dry Density, lb/ft$^3$ (g/cc) | 118 | 119 | 120 |
| Strength, 2 Hr, psi (Kg/cm$^2$) | 1372 | 1048 | 1168 |
| Strength, 8 day | 3292 | 2895 | 2600 |
| Bleed water | 0.0% | 0.4666% | None |

Compared to similar samples using a two repeating unit dispersant, MELFLUX 1641, the test sample 7-133 utilizes lower water than sample 12-95 with alpha, similar density and yet results in much higher compressive strength. This sample also utilizes the lowest dosage of the dispersant even though no alpha-calcined gypsum is present, thus demonstrating the superior efficacy of the three repeating unit dispersant in MELFLUX 2641F compared to the two repeating unit dispersant of MELFLUX 1641F.

EXAMPLE 2

Several floor formulations were made and tested using different gypsum sources. As shown in Table III-A and III-B, high strength flooring materials can be made using a variety of calcined gypsums and at varying water levels, still giving good sand stability and low bleed water.

TABLE III-A

Base Floor Underlayment Compositions

| Component | 5-153 | 5-085 | 5-105 |
|---|---|---|---|
| Beta-calcined Gypsum | 3775 | 2797 | 1500 |
| Source | Baltimore | Southard | Ft. Dodge |
| Alpha-calcined Gypsum | 0 | 960 | 2285 |
| Class C Cement | 200 | 205 | 200 |
| Type I Imp Mill Gray Cement | 0 | 0 | 0 |
| Defoamer | 7 | 7 | 2 |
| Boric Acid | 5 | 5 | 0 |
| CSA | 0.25 | 0.25 | 0.25 |
| Suma PreMix | 2 | 2 | 3 |
| Stab. Pre-Mix | 2 | 2 | 2 |
| MELFLUX 2641 F | 15 | 10 | 10 |
| MELFLUX 2651 F | 0 | 0 | 0 |
| Water, cc/1000 cc dry mix | 180 | 190 | 175 |
| Initial Slump, inches (cm) | 8.87 (22.5) | 8.94 (22.7) | 9.13 (23.2) |
| Density, 2 Hour | 133 | 133 | 134 |
| Strength, 2 Hour | 1231 | 1316 | 1408 |
| Density, 8 Day | 120 | 118 | 129 |
| Strength, 8 Day | 2796 | 3013 | 3129 |
| Bleed Water | 0.05% | 0.38% | 0.01% |
| Scum | Some | Some | Some |
| Sand Suspension | Great | Good | Good |
| Vicat Set (min | 86 | 63 | 69 |

TABLE III-B

Base Floor Underlayment Compositions

| Component | 2-144 | 5-75 |
|---|---|---|
| Beta-calcined Gypsum | 2797 | 1878 |
| Source | Southard | Southard |
| Alpha-calcined Gypsum | 960 | 1878 |
| Class C Cement | 0 | 205 |
| Type I Imp Mill Gray Cement | 205 | 0 |
| Defoamer | 2 | 7 |
| Boric Acid | 0 | 5 |
| CSA | 0.25 | 0.25 |
| Suma PreMix | 2 | 2 |
| Stab. Pre-Mix | 1 | 2 |
| MELFLUX 2641 F | 9 | 0 |
| MELFLUX 2651 F | 0 | 5 |
| Water, cc/1000 cc dry mix | 190 | 180 |
| Initial Slump, inches (cm) | 9 (23) | 9 (23) |
| Density, 2 Hour | 133 | 134 |
| Strength, 2 Hour | 1555 | 1193 |
| Density, 8 Day | 118 | 120 |
| Strength, 8 Day | 3525 | 3117 |
| Bleed Water | 0% | 0.14% |
| Scum | Some | Some |
| Sand Suspension | Great | Good |
| Vicat Set (min | 69 | 45 |

Formula 2-144 demonstrates that utilizing a plasticizer in the MELFLUX 2641F family of polycarboxylates allows for a reduction in the amount of stabilizer used, resulting in unexpectedly much higher strengths. As the plasticizer is reduced the sand holding characteristics of the stucco are uniquely improved allowing for this change. The result is that further reductions in the plasticizer usage are possible and that higher strength products can be made at the same plasticizer level. The data in the table demonstrates that the use of more than one type of cement is acceptable and in fact a wide range of cements are acceptable.

Formula 5-75 demonstrates that the ratio of alpha and beta stucco can be varied along with use of the MELFLUX 2651F plasticizer and the usage of the plasticizer dramatically reduced. This can reduce the negative effect associated with highly plasticized mixes such as the retardive effect of the plasticizer.

EXAMPLE 3

A high strength topping was made of the materials of Table IV. All measurements are in pounds.

TABLE IV

| | 4-271, 4-274 | 5-88 | 5-76 |
|---|---|---|---|
| C-BASE | 855 lbs | 855 lbs | 855 lbs |
| MOULDING | 655 lbs | 655 lbs | 655 lbs |
| CLASS-C-CEMENT | 225 lbs | 225 lbs | 225 lbs |
| TYPE 5 WHITE AABORG CEMENT | 237.5 lbs | 237.5 lbs | 237.5 |
| MELFLUX 1641F | 11 lbs | 0 lbs | 0 lbs |
| MELFLUX 2641F | 0 lbs | 11 lbs | 0 lbs |
| MELFLUX 2651F | 0 lbs | 0 lbs | 11 lbs |
| CN | 1 lb | 1 lb | 1 lb |
| CSA | 0.25 lbs | 0.25 lbs | 0.25 lbs |
| SODATE | 20 lbs | 20 lbs | 20 lbs |
| STAB. LVR PRE-MIX | 0.75 lbs | 0.75 lbs | 0.75 lbs |
| 50E200 | 1.80 lbs | 1.80 lbs | 1.80 lbs |
| RP-226 | 5.0 lbs | 5.0 lbs | 5.0 lbs |
| POTASSIUM | 2.5 lbs | 2.5 lbs | 2.5 lbs |
| OKLAHOMA SAND | 500 lbs | 500 lbs | 500 lbs |
| MOHAWK FINE SAND | 1500 lbs | 1500 lbs | 1500 lbs |

From the large batches made 4000 g of the dry mix material was mixed with the amount of water indicated below per 1000 g of dry mix. The data for slump and strength are reported in Table V.

TABLE V

| Water | 160 cc | 150 cc | 130 cc |
|---|---|---|---|
| Slump (inches, cm) | 10⁹⁄₁₆" | 10½" | 10¼" |
| Dry Density (#/ft3) | 124.4 | 128.10 | 133 |
| Dry Strength (PSI) | 8,258 | 9,483 | 10,240 |
| Vicat Set (min) | 40 | 44 | 70 |

Formulas made with the 2641F and 2651F dispersant plasticizer used less water and exhibited much higher dry strengthscompared to the 1641F plasticizer in the previous formula. This was accomplished using the same dosage rate for the plasticizers as compared to the MELFLUX 1641F formula. In addition the formula 5-76 employing the MELFLUX 2651F disperant exhibited longer set times which is favorable in that it improves the working time of the topping material. The formulas in both 5-76 and 5-88 allow for the reduction in plasticizer for lower cost while maintaining the strength and setting properties as compared to the MELFLUX 1641F formula. Formula 5-76 provides for the potential for reduction in retarder with the potential for maintaining the current setting and working characteristics.

What is claimed is:
1. A mixture to be employed in conjunction with water for preparing a slurry that hydrates to form a high strength gypsum compound, comprising:
 a modifier;

about 50% to about 99.8% by weight of calcium sulfate hemihydrate on an aggregate-free basis, wherein said calcium sulfate hemihydrate comprises at least 25% by weight of the beta-calcined form; and about 0.02% to about 10% by weight of a naphthalene-free polycarboxylate dispersant comprising a polyether repeating unit, an acrylic acid-type repeating unit and a maleic acid-type repeating unit.

2. The mixture of claim 1 wherein said calcium sulfate hemihydrate consists essentially of the beta-calcined form.

3. The mixture of claim 1 wherein said hemihydrate comprises from about 80% to about 95% by weight of said mixture.

4. The mixture of claim 1 wherein said mixture further comprises diutan gum.

5. The mixture of claim 1 wherein said mixture comprises from about 0.2% to about 1% by weight polycarboxylate on a dry, aggregate-free basis.

6. A subfloor comprising a hydrated product of a pumpable slurry comprising:

a dry mixture comprising about 50% to about 98% calcium sulfate hemihydrate on a dry, aggregate-free basis, said hemihydrate comprising at least 25% of the beta-calcined form;

about 0.02% to about 10% of a polycarboxylate dispersant comprising a polyether repeating unit, an acrylic acid-type repeating unit and a maleic acid-type repeating unit; and from about 12 cc to about 40 cc water per 100 grams of a combined mixture of the hemihydrate, the polycarboxylate and the modifier on a dry solids basis, said hydrated product having a compressive strength in excess of 2500 psi (175 Kg/cm$^2$).

7. The subfloor of claim 6 wherein said hemihydrate consists essentially of beta-calcined hemihydrate.

8. The subfloor of claim 6 wherein the concentration of said polycarboxylate dispersant is from about 0.2% to about 1% by weight on a dry, aggregate-free basis.

9. The subfloor of claim 6 further comprising a modifier.

10. The subfloor of claim 9 wherein said modifier is selected from the group consisting of cement, a silicate, a carbonate and a phosphate compound.

11. The subfloor of claim 6 wherein said water is present in an amount less than 35 cc water per 100 grams mixture on a dry, aggregate-free basis.

12. The subfloor of claim 11 wherein said water is present in an amount less than 25 cc per 100 grams of said mixture on a dry, aggregate-free basis.

13. A method for making a slurry for a subfloor comprising:

selecting a dispersant comprising a polyether repeating unit, an acrylic acid-type repeating unit and a maleic acid-type repeating unit;

choosing a modifier;

forming a dry mixture comprising at least 50% calcium sulfate hemihydrate, wherein said calcium sulfate hemihydrate comprises at least 25% by weight of the beta-calcined form;

obtaining water;

combining the dispersant, modifier, dry mixture and water to form a slurry.

14. The method of claim 13, wherein the dry mixture in said forming step further comprises at least one of the group consisting of set accelerators, set retarders, biocides, defoamers, polysaccharides, thickeners, coloring agents, preservatives and polymeric resins.

15. The method of claim 13 wherein the modifier is selected from the group consisting of sodium carbonate, potassium carbonate and lime.

16. The method of claim 13 wherein the dispersant is in liquid form.

17. The method of claim 13, wherein said combining step further comprises mixing said dispersant into said water prior to addition of the dry mixture.

18. The method of claim 13 further comprising applying the slurry to a substrate.

* * * * *